(12) United States Patent
Besore et al.

(10) Patent No.: US 9,217,654 B2
(45) Date of Patent: Dec. 22, 2015

(54) SUBMETERING HYDROCARBON FUELED WATER HEATERS WITH ENERGY MANAGER SYSTEMS

(75) Inventors: John K. Besore, Prospect, KY (US); Michael Thomas Beyerle, Pewee Valley, KY (US); Timothy Dale Worthington, Crestwood, KY (US); Joseph Mark Brian, Louisville, KY (US)

(73) Assignee: General Electric Company, Schenectady, NY (US)

( * ) Notice: Subject to any disclaimer, the term of this patent is extended or adjusted under 35 U.S.C. 154(b) by 633 days.

(21) Appl. No.: 12/882,383

(22) Filed: Sep. 15, 2010

(65) Prior Publication Data

US 2012/0052453 A1 Mar. 1, 2012

(51) Int. Cl.
*G01F 1/66* (2006.01)
*F24H 1/12* (2006.01)
*F24H 1/18* (2006.01)
(Continued)

(52) U.S. Cl.
CPC .......... *G01F 1/666* (2013.01); *F24D 19/1048* (2013.01); *F24D 19/1063* (2013.01); *F24H 1/124* (2013.01); *F24H 1/186* (2013.01); *F24H 9/2035* (2013.01); *G01F 1/20* (2013.01); *G01F 1/206* (2013.01); *G01F 15/075* (2013.01); *G06Q 10/06* (2013.01); *G06Q 10/063* (2013.01); *G06Q 50/06* (2013.01); *F23N 2005/181* (2013.01); *F24D 2220/042* (2013.01); *F24D 2220/044* (2013.01); *G01K 17/08* (2013.01)

(58) Field of Classification Search
CPC ... F23N 2005/185; F23N 1/002; F23N 1/005; F23N 2005/181; F22B 35/18; F22B 37/76; F24D 19/1081; F24D 19/1063; F24D 19/1048; F24D 2220/044; F24D 2220/042; G05D 23/1951; G01F 15/075; G01F 1/666; G01F 1/20; G01F 1/205; G01K 17/06; G01K 17/08; G06Q 50/06; G06Q 10/06; G06Q 10/063; F24H 1/124; F24H 1/186; F24H 9/2035
USPC .................. 431/14, 2, 13, 76; 122/14.2, 14.3, 122/14.21; 236/1 A, 15 BG, 20 A, 26 A
See application file for complete search history.

(56) References Cited

U.S. PATENT DOCUMENTS 2,876,727 A * 3/1959 Barnard et al. ............... 114/337
3,074,644 A * 1/1963 Geniesse ..................... 236/15 E (Continued)

FOREIGN PATENT DOCUMENTS

JP 01150703 A * 6/1989 .............. F22B 37/38
JP 2003222400 A * 8/2003 ................ F24H 1/10

*Primary Examiner* — Gregory Huson
*Assistant Examiner* — Daniel E Namay
(74) *Attorney, Agent, or Firm* — Dority & Manning, P.A.

(57) ABSTRACT

A hydrocarbon-fueled hot water heater for supplying hot water includes a cold water inlet, a hot water outlet, a selectively activatable burner for applying heat to a volume of water between the inlet and the outlet, a sensor for sensing activation of the at least one burner, and a communication interface for communicating data corresponding to the activation of the at least one burner to a processor configured to multiply the amount of time the burner is activated by a known value corresponding to a flow rate of the burner to estimate an amount of fuel consumed by the hydrocarbon-fueled hot water heater. Other devices and methods of submetering hydrocarbon fueled water heaters are also included.

13 Claims, 6 Drawing Sheets

(51) Int. Cl.
  *F24H 9/20*     (2006.01)
  *F24D 19/10*    (2006.01)
  *G06Q 10/06*    (2012.01)
  *G06Q 50/06*    (2012.01)
  *G01F 1/20*     (2006.01)
  *G01F 15/075*   (2006.01)
  *F23N 5/18*     (2006.01)
  *G01K 17/08*    (2006.01)

(56) References Cited

U.S. PATENT DOCUMENTS

| | | | |
|---|---|---|---|
| 3,216,661 A * | 11/1965 | Sawyer | 236/15 E |
| 3,241,597 A * | 3/1966 | Juzi | 236/26 R |
| 3,243,116 A * | 3/1966 | Dijt et al. | 431/12 |
| 3,503,553 A * | 3/1970 | Schomaker | 236/14 |
| 3,939,328 A * | 2/1976 | Davis | 700/41 |
| 4,079,885 A * | 3/1978 | Decker | 236/1 G |
| 4,138,725 A * | 2/1979 | Ikemoto et al. | 700/274 |
| 4,139,339 A * | 2/1979 | Straitz, III | 431/202 |
| 4,337,893 A * | 7/1982 | Flanders et al. | 237/7 |
| 4,340,355 A * | 7/1982 | Nelson et al. | 431/20 |
| 4,373,663 A * | 2/1983 | Hammer | 236/15 R |
| 4,395,226 A * | 7/1983 | Nakanishi et al. | 431/76 |
| 4,484,515 A * | 11/1984 | Illy | 99/282 |
| 4,485,746 A * | 12/1984 | Erlandsson | 110/234 |
| 4,501,261 A * | 2/1985 | Tsutsui et al. | 122/14.3 |
| 4,576,570 A * | 3/1986 | Adams et al. | 431/12 |
| 4,586,893 A * | 5/1986 | Somerville et al. | 431/76 |
| 4,708,636 A * | 11/1987 | Johnson | 431/20 |
| 4,712,996 A * | 12/1987 | Adams et al. | 431/20 |
| 4,921,163 A * | 5/1990 | Viessmann | 236/46 R |
| 5,040,725 A * | 8/1991 | Butler | 237/8 R |
| 5,055,825 A * | 10/1991 | Yang | 340/439 |
| 5,205,486 A * | 4/1993 | Jung | 236/94 |
| 5,492,006 A * | 2/1996 | Beckett | 73/114.01 |
| 5,570,659 A * | 11/1996 | Cohen | 122/14.21 |
| 5,692,676 A * | 12/1997 | Walker | 237/8 R |
| 5,708,354 A * | 1/1998 | Hancock et al. | 323/265 |
| 5,775,582 A * | 7/1998 | Hammer | 237/8 A |
| 5,820,362 A * | 10/1998 | Broach | 432/29 |
| 6,035,810 A * | 3/2000 | Movassaghi | 122/24 |
| 6,247,919 B1 * | 6/2001 | Welz et al. | 431/13 |
| 6,386,755 B1 * | 5/2002 | Draxton et al. | 374/117 |
| RE37,745 E * | 6/2002 | Brandt et al. | 122/14.2 |
| 6,402,043 B1 * | 6/2002 | Cockerill | 236/78 D |
| 6,444,958 B1 * | 9/2002 | Campbell | 219/460.1 |
| 6,536,678 B2 * | 3/2003 | Pouchak | 237/7 |
| 6,647,302 B2 * | 11/2003 | Pouchak | 700/83 |
| 6,726,358 B2 * | 4/2004 | Draxton et al. | 374/115 |
| 6,745,085 B2 * | 6/2004 | Pouchak | 700/21 |
| 6,813,631 B2 * | 11/2004 | Pouchak et al. | 709/203 |
| 6,834,992 B2 * | 12/2004 | Draxton et al. | 374/115 |
| 6,853,934 B2 * | 2/2005 | Nagamatsu | 702/77 |
| 7,284,709 B2 * | 10/2007 | Guyer | 237/12.1 |
| 7,469,647 B2 * | 12/2008 | Widmer et al. | 110/345 |
| 7,490,011 B2 * | 2/2009 | Cottrell | 702/39 |
| 7,661,327 B2 * | 2/2010 | Bourgein et al. | 73/865.9 |
| 7,720,635 B2 * | 5/2010 | Donath et al. | 702/182 |
| 7,748,976 B2 * | 7/2010 | Burrahm et al. | 431/2 |
| 7,806,682 B2 * | 10/2010 | Cueva | 431/75 |
| 8,000,934 B2 * | 8/2011 | Oberascher et al. | 702/182 |
| 8,109,758 B2 * | 2/2012 | Kim | 431/12 |
| 8,381,689 B2 * | 2/2013 | Huang et al. | 122/14.22 |
| 8,636,501 B2 * | 1/2014 | Geiger et al. | 431/12 |
| 2002/0011220 A1 * | 1/2002 | Kayahara et al. | 122/396 |
| 2002/0099474 A1 * | 7/2002 | Khesin | 700/274 |
| 2002/0106597 A1 * | 8/2002 | Grando et al. | 431/24 |
| 2002/0131472 A1 * | 9/2002 | Draxton et al. | 374/115 |
| 2003/0125890 A1 * | 7/2003 | Nagamatsu | 702/77 |
| 2003/0144932 A1 * | 7/2003 | Martin et al. | 705/32 |
| 2004/0052295 A1 * | 3/2004 | Draxton et al. | 374/117 |
| 2004/0162792 A1 * | 8/2004 | Satou et al. | 705/400 |
| 2005/0130086 A1 * | 6/2005 | MacNutt et al. | 431/14 |
| 2005/0181319 A1 * | 8/2005 | Tamura | 431/158 |
| 2006/0025938 A1 * | 2/2006 | Cottrell | 702/39 |
| 2007/0154322 A1 * | 7/2007 | Stiles et al. | 417/44.1 |
| 2008/0021749 A1 * | 1/2008 | Hope | 705/7 |
| 2008/0092826 A1 * | 4/2008 | Kishimoto et al. | 122/14.1 |
| 2008/0108001 A1 * | 5/2008 | Huang | 431/80 |
| 2008/0108002 A1 * | 5/2008 | Huang | 431/80 |
| 2008/0138750 A1 * | 6/2008 | Kim | 431/12 |
| 2008/0293001 A1 * | 11/2008 | Bohan, Jr. | 431/76 |
| 2009/0132097 A1 * | 5/2009 | Sharma et al. | 700/300 |
| 2009/0151573 A1 * | 6/2009 | Tonelli et al. | 99/280 |
| 2009/0159017 A1 * | 6/2009 | Tsuge | 122/14.1 |
| 2009/0177414 A1 * | 7/2009 | Cottrell | 702/39 |
| 2009/0223466 A1 * | 9/2009 | Knorr, Jr. | 122/448.1 |
| 2009/0250344 A1 * | 10/2009 | Ohya et al. | 204/425 |
| 2009/0280240 A1 * | 11/2009 | Ohya et al. | 427/125 |
| 2010/0004790 A1 * | 1/2010 | Harbin et al. | 700/291 |
| 2010/0064769 A1 * | 3/2010 | Wang | 73/23.31 |
| 2010/0112500 A1 * | 5/2010 | Maiello et al. | 431/76 |
| 2010/0329650 A1 * | 12/2010 | Kim et al. | 392/449 |
| 2011/0011315 A1 * | 1/2011 | Hayashi et al. | 110/345 |
| 2011/0147194 A1 * | 6/2011 | Kamen et al. | 202/185.1 |
| 2011/0155268 A1 * | 6/2011 | Ueki et al. | 137/551 |
| 2011/0178644 A1 * | 7/2011 | Picton | 700/282 |
| 2012/0006527 A1 * | 1/2012 | Huang et al. | 165/295 |

* cited by examiner

SUBMETERING HYDROCARBON FUELED WATER HEATERS WITH ENERGY MANAGER SYSTEMS

BACKGROUND OF THE DISCLOSURE

The following disclosure relates to energy management, and more particularly to energy management of household consumer appliances, as well as other energy consuming devices and/or systems found in the home. The present disclosure finds particular application to a hydrocarbon fueled hot water heater.

Home energy management (HEM) systems are becoming a key to reducing energy consumption in homes and buildings, in a consumer friendly manner. Existing HEMs are commonly placed in one of two general categories: In the first category, the HEM is in the form of a special custom configured computer with an integrated display, which communicates to devices in the home and stores data, and also has simple algorithms to enable energy reduction. This type of device may also include a keypad for data entry or the display may be a touch screen. In either arrangement, the display, computer and key pad (if used) are formed as a single unit. This single unit is either integrated in a unitary housing, or if the display is not in the same housing, the display and computer are otherwise connected associated upon delivery from the factory and/or synchronized or tuned to work as a single unit. In the second category, the HEM is in the form of a low cost router/gateway device in a home that collects information from devices within the home and sends it to a remote server and in return receives control commands from the remote server and transmits it to energy consuming devices in the home. In this category, again, as in the first, the HEM may be a custom configured device including a computer and integrated/associated display (and keypad, if used) designed as a single unit. Alternately, the HEM maybe implemented as home computer such as laptop or desktop operating software to customize the home computer this use.

Key functions of a HEM system can include:
Creates a network of energy consuming devices within the home,
Measures the consumption of the whole home/building or individual devices,
Records and stores energy consumption information in a database, and
Enables consumer interface with all energy consuming devices in a home to:
view consumption data of individual devices
set preferences for operation of energy consuming devices at different times during the day or at different energy pricing levels
control/program energy consuming devices.

While the integration of a HEM to existing electrical devices in a residence is relatively straightforward, hydrocarbon fueled devices such as water heaters and or furnaces present a more challenging situation because they do not consume electricity as their primary energy source. A basic hot water heater generally includes a water reservoir, a heating element and a thermostat or other temperature controller that controls the burner to maintain a set temperature of the water in the reservoir. In general, the temperature of the water is maintained at a relatively constant level corresponding to a set point of the thermostat, for example 140 degrees F., until it is needed. As hot water is dispensed from the reservoir, cold water is admitted thereby lowering the temperature of the water. Once the temperature drops below the set point of the thermostat, the heating element is activated to raise the temperature of the water. Burner comes on to maintain temperature too.

Gas hot water heaters burn gas, such as natural gas or propane, to heat water. Typically, the amount of gas used by the hot water heater is not readily ascertainable unless the gas water heater is the only gas-powered appliance in the home, and such scenario is not common. Even if the gas water heater is the only gas-powered appliance in the home, the gas consumption of the unit is generally not known to the consumer until a monthly bill is issued for the gas used during the previous month. The lack of a reliable way to determine gas usage of hydrocarbon fueled hot water heaters can frustrate consumers' attempts to control energy usage of such hot water heaters, and prevent their integration into a HEM system.

SUMMARY OF THE DISCLOSURE

A hydrocarbon fueled hot water heater that includes fuel consumption reporting to enable consumers to better understand and control the energy usage and/or efficiency of the hot water heater. By providing the consumer with fuel consumption information, the consumer can make decisions regarding the set point temperature and/or other scheduling can not only reduce energy consumption, but also save the consumer money.

According to one aspect a hydrocarbon-fueled hot water heater for supplying hot water comprises a cold water inlet, a hot water outlet, a selectively activatable burner for applying heat to a volume of water between the inlet and the outlet, a sensor for sensing activation of the at least one burner, and a communication interface for communicating data corresponding to the activation of the at least one burner to a processor configured to multiply the amount of time the burner is activated by a known value corresponding to a flow rate of the burner to estimate an amount of fuel consumed by the hydrocarbon-fueled hot water heater.

The processor can be remote from the hot water heater, or included in a home energy manager unit. The sensor can include at least one of a thermocouple, a thermistor or an infrared sensor to sense activation of the burner by sensing a change in temperature. The sensor can include a flow transducer to detect a change in flow rate of exhaust gas corresponding to activation of the burner. The sensor can include a strain gauge to detect a change in dimension of an exhaust vent pipe or other component due to hot exhaust gas emanating from the burner when activated. The sensor can include an acoustical sensor for detecting noise resulting from activation of the burner. The sensor can include an accelerometer for detecting a vibration signal generated during activation of the burner. The sensor can include a transducer to detect spent gases in the exhaust stack which result from byproducts of the combustion process.

The hot water heater may further include a display for displaying an indicator corresponding to the fuel consumed by the hot water heater. The display can display at least one of total energy consumption or cost, annual energy consumption or cost, monthly energy consumption or cost, weekly energy consumption or cost, daily energy consumption or cost, hourly energy consumption cost, and instantaneous energy consumption or cost. The display can be remote from the water heater, or associated with a HEM unit in communication with the hot water heater. At least one of a numerical value, graphical representation, color, or shape corresponding to fuel consumed can be displayed on the display. The hot water heater can be integrated in a home energy management system, wherein the home energy manager includes the processor configured to store data corresponding to the "on time" of the burner and then multiply the amount of time the burner is activated by a known value corresponding to a flow rate of the burner to estimate an amount of fuel consumed.

According to another aspect a hydrocarbon-fueled hot water heater for supplying hot water comprises a cold water inlet, a hot water outlet, a selectively activatable burner for applying heat to a volume of water between the inlet and the outlet, a sensor for sensing a volume of hot water flowing through the hot water heater over a period of time, and a communication interface for communicating data corresponding to the sensed volume of water to a processor. The processor is configured to utilize the data to estimate an amount of fuel used by the water heater over a given period of time based on the sensed volume.

The processor can be further configured to: convert the sensed volume of water to a weight, multiply the weight by a factor corresponding to an amount of energy required to heat a unit weight of the water by 1 degree, multiply the value obtained in the preceding step by the change in water temperature between the inlet and the outlet to determine energy required to heat the sensed volume of water, divide the energy required to heat the sensed volume of water by a gross heat of combustion value for the fuel used by the water heater to determine the amount of fuel used by the water heater over a given period of time based on the volume of water flowing through the hot water heater. The hot water heater can be of a tankless design, and can include a communication interface for communicating fuel usage data to a home energy manager. A home energy management system is provided comprising a home energy manager unit and the hydrocarbon-fueled hot water heater as set forth wherein the home energy manager unit includes the processor.

According to another aspect a hydro-carbon fueled hot water heater comprises a cold water inlet, a hot water outlet, a selectively activatable burner for applying heat to a volume of water between the inlet and the outlet, a flow meter for measuring an amount of fuel supplied to the burner, and a communication interface for communicating data relating to the amount of fuel supplied to the burner to a home energy management unit for use in calculating a cost associated with operation of the hydro-carbon fueled hot water heater.

According to still another aspect, a method of monitoring energy consumption of hydrocarbon-fueled hot water heater, the hot water heater having at least one burner for burning fuel that is selectively activated to apply heat to a volume of water, the method comprising:

sensing activation of the at least one burner; and multiplying the amount of time the burner is activated by a known value corresponding to a flow rate of the burner to estimate an amount of fuel consumed by the hydrocarbon-fueled water heater. The method can further comprise communicating at least one of the amount of time sensed and the amount of fuel consumed to a home energy management unit.

DETAILED DESCRIPTION OF THE PREFERRED EMBODIMENTS

Figure 1:
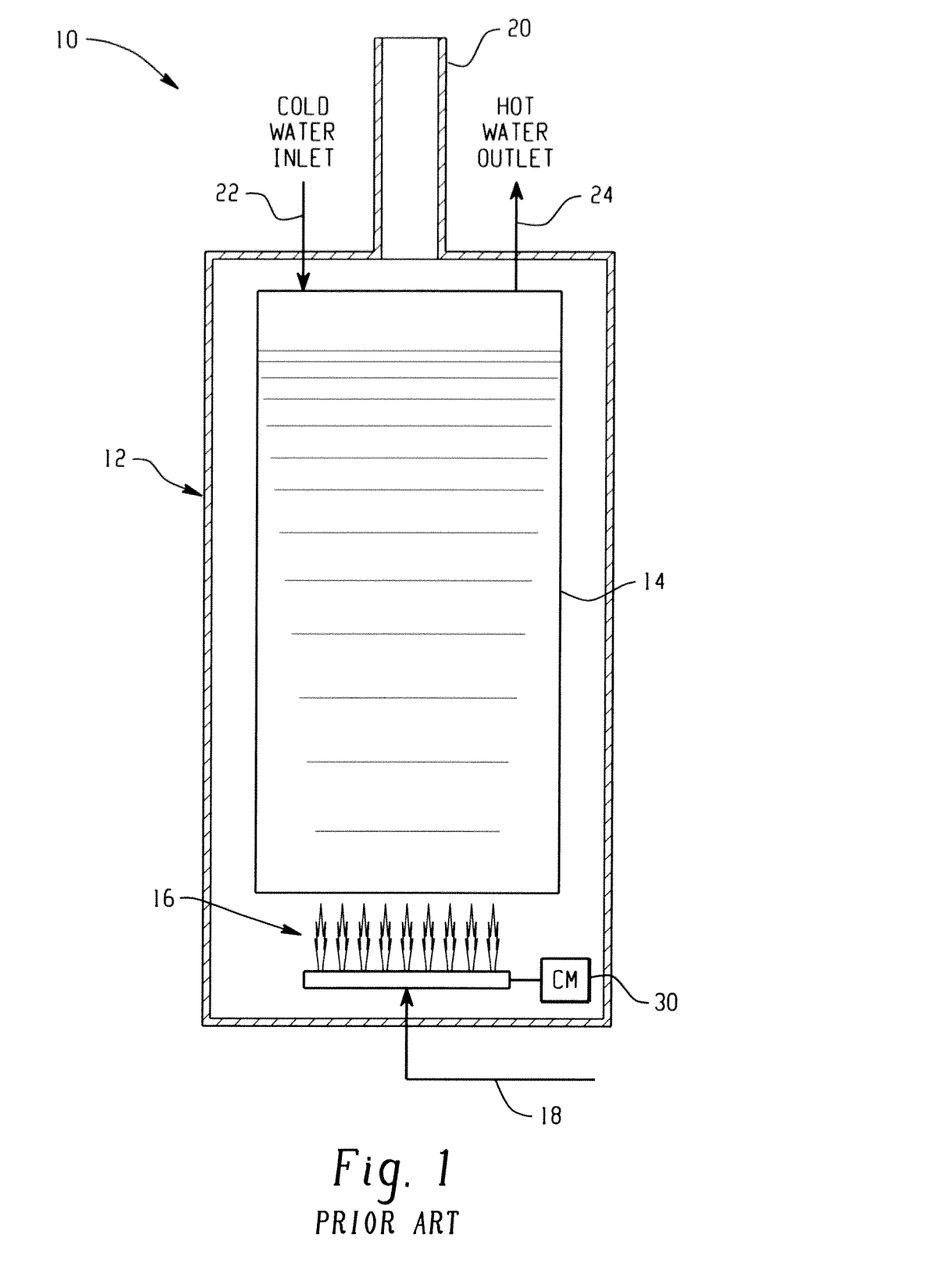
FIG. 1 is a schematic diagram of an exemplary conventional hydrocarbon-fueled hot water heater.

Turning now to the drawings, FIG. 1 illustrates a conventional hydrocarbon-fueled hot water heater 10 including a housing 12 in a which a reservoir or tank 14 and a heat source in the form of a burner 16, are supported. The burner 16 burns fuel from a fuel source 18, typically natural gas or propane, to generate heat to heat the water in the tank 14. Hot combustion gasses created by the burner flow from a vent stack 20 to an exterior of the unit. Cold water is admitted to the reservoir 14 via cold water inlet 22. Hot water is dispensed via a hot water outlet 24 for distribution to one or more hot water taps.

As will be appreciated, a conventional hydrocarbon fueled hot water heater, such as hot water heater 10, will further include a gas burner control module for controlling the operation of the burner 16. Such a control module 30 may typically include a thermocouple, one or more valves, and a pilot or other ignition source for igniting the burner. As will be appreciated, the control module 30 operates to activate the burner 16 to apply heat to a volume of water to heat the water to a desired set point.

Traditionally, the amount of fuel burned by a conventional hydrocarbon-fueled water heater has not been readily ascertainable. Accordingly, consumers typically are not aware of the energy costs associated with hot water usage. The following figures and description set forth several devices and methods of acquiring fuel consumption data that is indicative of the energy usage and/or the actual cost of energy to heat water in a hydrocarbon fueled hot water heater.

Since most hydrocarbon ("gas fired") water heaters and furnaces do not have a throttling mechanism (i.e., the burner or burners are either on at 100% capacity or off) one can use a timing mechanism to determine the "on time" the burner is activated and then use the rated capacity of the burner to "back into" the amount of fuel that is consumed. Typically, there are several assumptions made in order to implement this method: 1) assuming that the orifices that flow gas are flowing at the rated capacity, 2) assuming that the line pressure of the gas supply is within specifications, and 3) assuming that by ignoring the pilot gas consumption (for those units that may have a pilot & thermocouple) does not significantly impact the estimation. This estimation method would take the form of:

$$\text{gas consumed} = \text{time on}, t(\text{minutes}) * \text{flow rate}(cfm) = x \text{ cubic feet consumed in time } t$$

The estimation of gas flow during the on cycle can be "back calculated" by knowing the burner rated capacity. Then, the flowrate would emerge from the equation:

$$\text{Flowrate} = \text{burner capacity}(BTU)/\text{gross heat of combustion of natural gas}$$

Gross heat of combustion for natural gas is typically about 1000 Btu/ft^3 (value would be different for propane). This equation yields cfm of gas flow/minute of burner on-time. If one wanted to optimize the accuracy, an efficiency factor that relates to the water heater efficiency could be applied to this equation. This would increase the flowrate of gas for a given capacity.

Thus, it will now be appreciated that by measuring just the burner "on time" the gas consumption of the hot water heater can be estimated using the above-described method. As will now be described, detecting burner "on time" can be performed with one or more of a variety of sensors that sense heat, vibration, sound, combustion gasses, etc.

Figure 2:
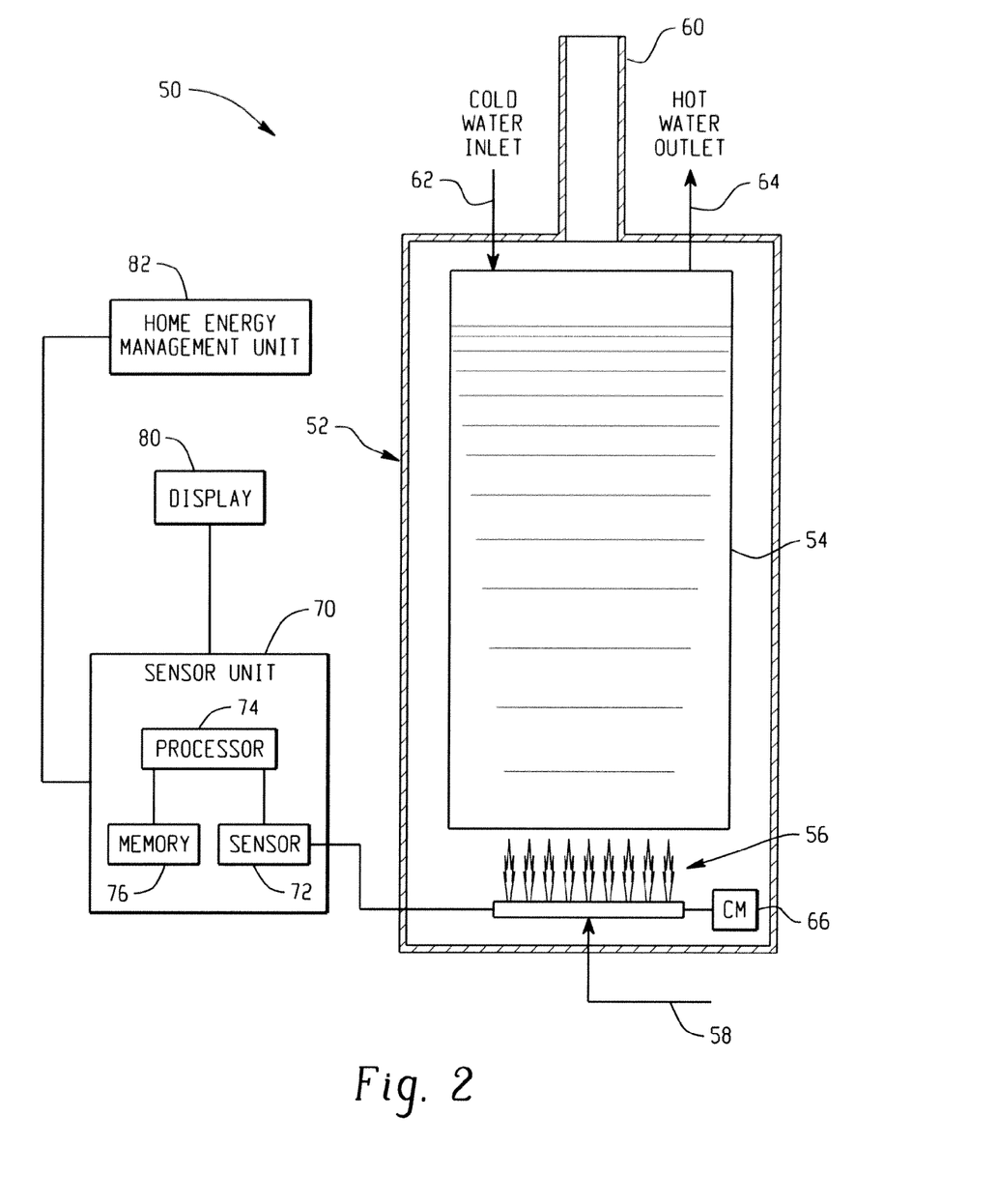
FIG. 2 is a schematic diagram of an exemplary hydrocarbon-fueled hot water heater in accordance with the present disclosure.

Turning to FIG. 2, an exemplary hot water heater system 50 is illustrated. The hot water heater system 50 includes a hydrocarbon-fueled hot water heater 52 having a reservoir 54 and a burner 56 for applying heat to a volume of water. The burner 56 burns fuel supplied thereto from a fuel supply 58. Hot exhaust gases are discharged via the vent stack 60. Cold water is admitted to the water heater 52 via inlet 62, and hot water is discharged via hot water outlet 64. A control module 66 controls the burner. As described thus far, the hot water heater 52 is similar to the conventional hot water heater 10 of FIG. 1.

In accordance with the present disclosure, a sensor unit 70 is provided for sensing activation of the burner 56. In the illustrated embodiment, the sensor unit 70 includes a sensor 72 and a processor 74. The processor 74 is in communication with the sensor 72 and a memory 76 for storing data related to the burner on time, which the processor 74 uses for calculating the burner on-time as described above. The sensor 72 can include one or more of the following:

a thermistor or thermocouple attached adjacent to the burner to detect the burner "on time". The thermistor or thermocouple could detect slopes of change in the temperature vs. time variable. The up and down slope signal can then be collected by a converter and sent to the processor to determine the "on times" of the burner.

an IR detector, heat detector, or other transducer that can detect a flame in the water heater burner area. The start and stop times of the flame can be sent to the processor for calculating the "total on time" between two points in time a thermoelectric device that generates a voltage proportional to the temperature increase near the burner. By monitoring this voltage and/or sending the signal to the processor, the processor can use such information to calculate burner on time.

an acoustic or vibration detection device in the burner area can be used to detect the presence of combustion in the burner area to identify the "on" & "off" conditions of the burner. For example, a microphone can be tuned to detect burner noise. An accelerometer can be used to detect vibrations.

Once the burner "on time" is calculated, the energy usage in terms of volume, cost etc. can be displayed to a user on a display 80. In this embodiment, the display is associated with the sensor unit 70. Both the sensor unit 70 and the display 80 can be provided integrally with the water heater 52, or as add-on components mounted thereto. Further, information from the sensor unit 70 can be relayed to a home energy manager (HEM) 82 for use in HEM algorithms. In some embodiments, the display 80 can be associated with the HEM thus obviating the need for a dedicated display to be provided to display the energy usage details at the hot water heater itself.

Figure 3:
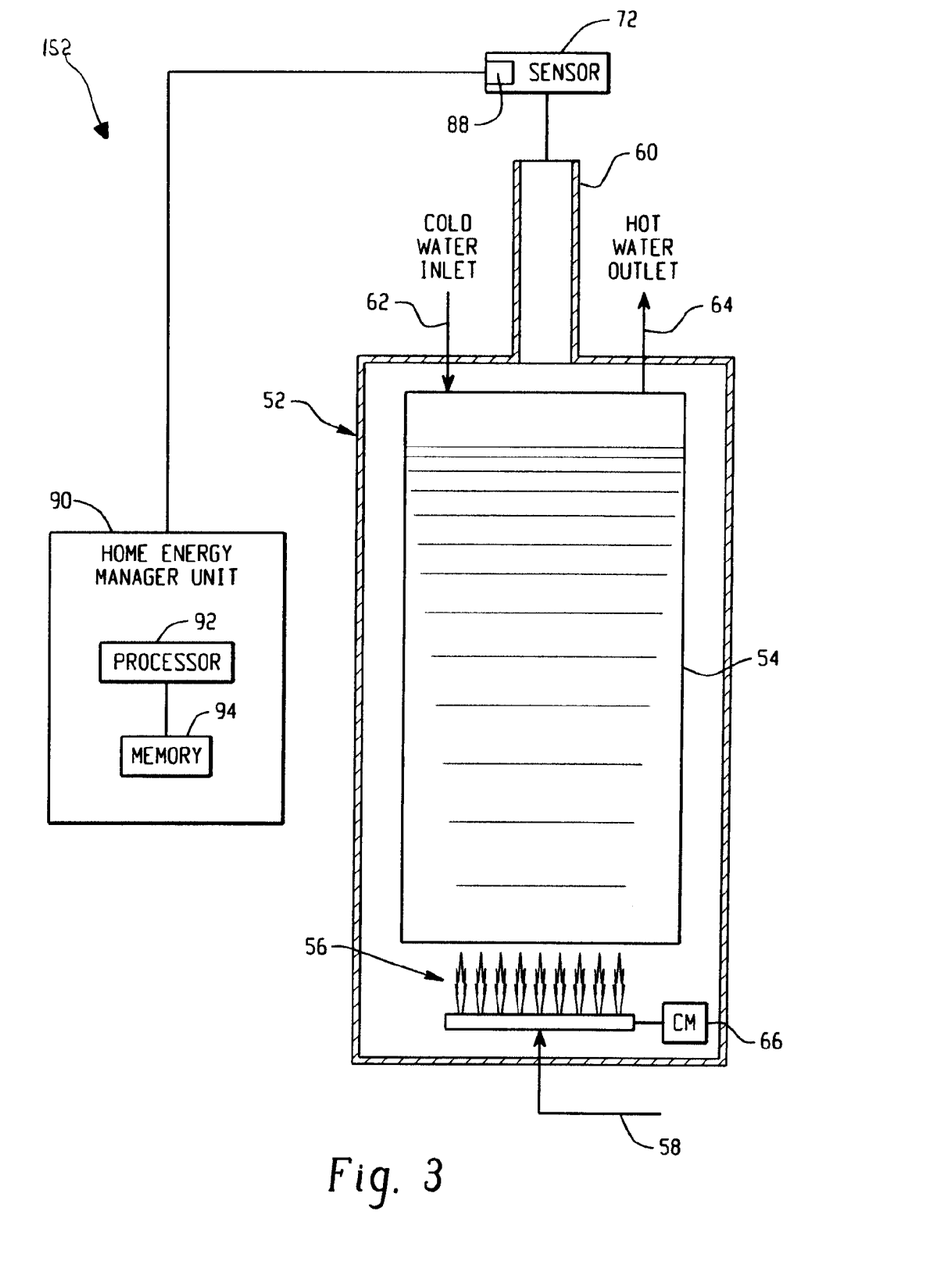
FIG. 3 is a schematic diagram of another exemplary hydrocarbon-fueled hot water heater in accordance with the present disclosure.

Turning to FIG. 3, another exemplary hot water heater system 152 in accordance with the present disclosure is illustrated. In this embodiment, a sensor 72 is provided on or adjacent the vent stack 60 of the hot water heater 52 and is configured to detect physical and/or chemical changes that occur during activation/deactivation of the burner 56. The sensor includes a communication interface 88 for communicating data to a home energy manager unit 90 that includes a processor 92 and memory 94 for calculating energy usage in accordance with the previously described method. As will be appreciated, the sensor 72 could also be provided as part of a sensor unit (e.g., as in FIG. 2) including the processor, memory, etc.

In FIG. 3, the sensor 72 can include one or more of the following:

a thermistor or thermocouple attached to the vent pipe 60 to detect the burner "on time". The thermistor or thermocouple would look for slopes of change in the temperature vs. time variable. When the burner 56 ignites or extinguishes, the temperature profile of the stack very closely tracks these points in time and it is evident in the slope of the line. The up and down slope signal can then be collected by a converter and sent to the HEM via a wireless connection to determine the "on times" of the burner.

a flow transducer within the vent stack 60 to detect the flow of expelled gases to give an indication of "burner on". The probe of such sensor would likely need to be tolerant of high temperature gases flowing.

a strain gauge on the surface of the vent pipe to detect the strain rate change due to the expansion caused by the hot gases in the vent stack 60. As before, the strain gauge likely would need to be tolerant of high temperatures.

a thermoelectric device capable of generating a voltage proportional to the temperature increase in the stack 60 due to exhaust gases. By monitoring this voltage and sending the signal to the HEM or other processor, activation of the burner can be detected.

similarly, one could employ a gas sensor, such as a carbon monoxide (CO) sensor, in the vent stack 60 to detect the presence of carbon monoxide, or any other inert gas sensor, that would be present in the exhaust gases from the combustion process to capture the on and off conditions of the burner.

Figure 4:
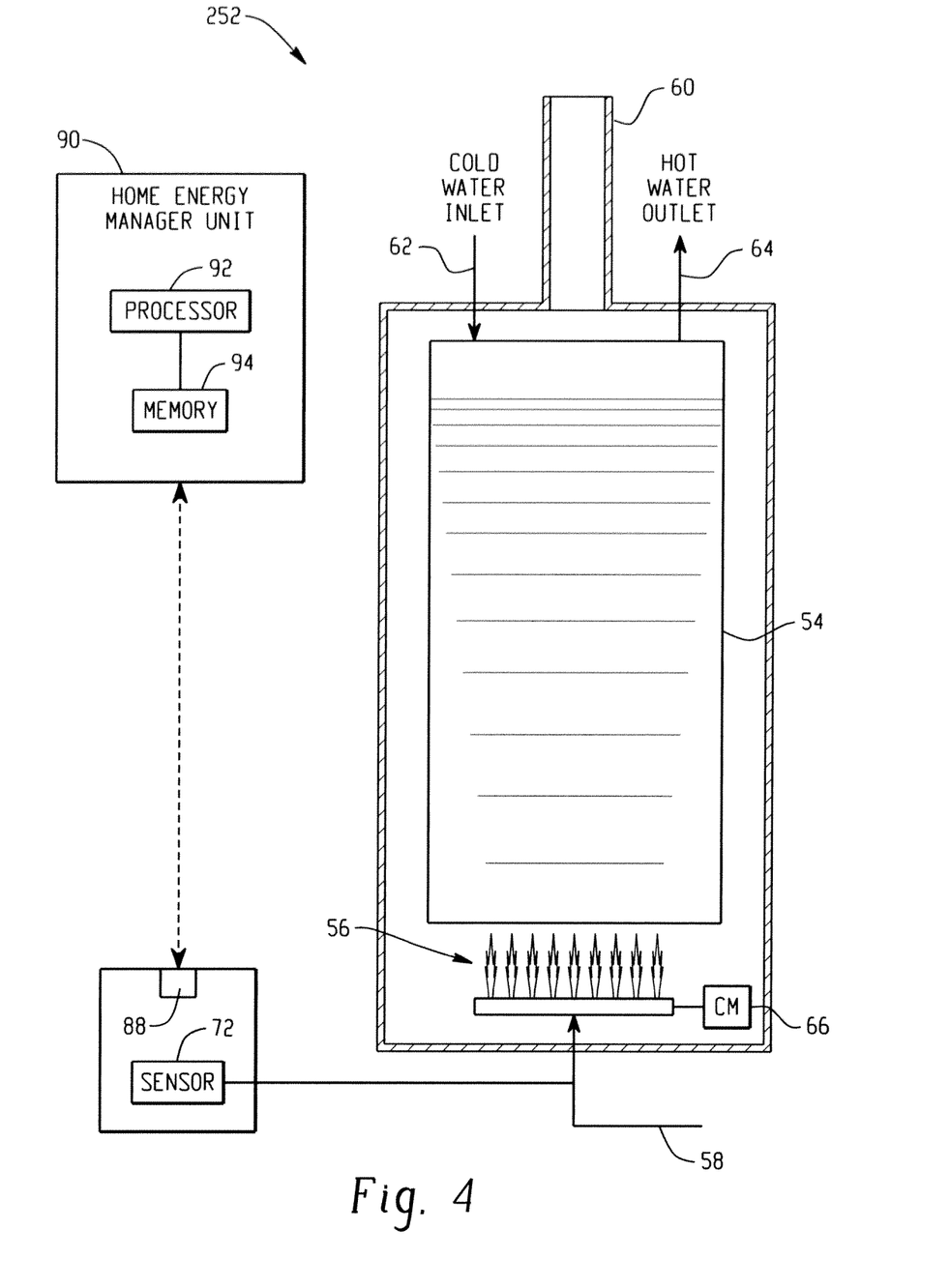
FIG. 4 is a schematic diagram of yet another exemplary hydrocarbon-fueled hot water heater in accordance with the present disclosure.

Another option of determining gas flow would be to incorporate a sensor in the form of a flowmeter in the gas line 58 supplying fuel to the water heater 52. This embodiment is illustrated in FIG. 4 wherein sensor 72 is in the form of a flowmeter. Like the other embodiments, the sensor 72 provides data to a processor 92 via a communication interface 88 for calculating the amount of gas consumed. Of course, the sensor 72 in this embodiment may report directly the amount of gas consumed since it is a flowmeter.

The aforementioned sensors and methods of detecting burner activation can result in estimates of fuel consumption having varying levels of accuracy depending on the type of sensor used. Some sensor types will experience a lag factor that can be accounted for in calculations. Although described in the context of tank water heaters, the above-described systems can be applied to tankless water heaters as well.

As will be appreciated, there are four key variables one can detect to establish the state of the gas burner: heat/flame at the burner, gas flow, effluent gas flow, and water flow. The preceding discussion and FIGS. 2-4 generally relate to the heat/flame, gas flow, and effluent gas flow variables. The remaining description covers the water flow variable.

Gas usage of a water heater may be totally proportional to the amount of hot water dispensed in the house. Every dispensation of water from a water heater does not trigger the burner on. However, in the long term energy is required to raise every gallon of water that is dispensed from the input temperature of about 50-60 F to the setpoint temperature which is typically 130-140 F. Therefore, simply using water flow generally may not give as accurate short term gas usages as the processes noted above but it remains possible to "back into" the gas usage from water flow numbers. The process includes the following steps:

Each time hot water is dispensed (this scheme involves separately metering hot water from cold water), the total amount of water dispensed is recorded. Hot water usage is broken up into blocks of time, and gas usage is calculated for that block of time, such as ¼ hour for example.

Knowing how much water was dispensed during the last ¼ hour, the system can calculate the gas usage via the following steps:
 i. BTU required gallons dispensed*8.3 lbm/gallon*1.0 BTU/lbm-Deg F*(setpoint temp or dispensed temperature-inlet water temp)
 ii. The time the burner will be on to deliver this amount of BTU's can be calculated from the equation: On time=BTU's/burner capacity*burner efficiency
 iii. Then, knowing the gross heat of combustion for the gas used (i.e., ~1000 BTU/cubic ft for methane), one can calculate the cubic feet required by dividing the BTU's from (ii) by this number
 iv. Further, this system can calculate or predict the time required to heat a given volume draw of water by the equation: Burner on time=BTU from (i) above for a given volume of water/(burner capacity*efficiency)

The above system and method will be much more accurate for water heaters that are tankless, since the burners in water heaters incorporating tanks will cycle on without dispensing water to maintain temperature in the tank. As discussed below, however, similar systems and methods can be used to estimate energy consumption of a water heater having a tank by accounting for such "maintenance" energy.

Figure 5:
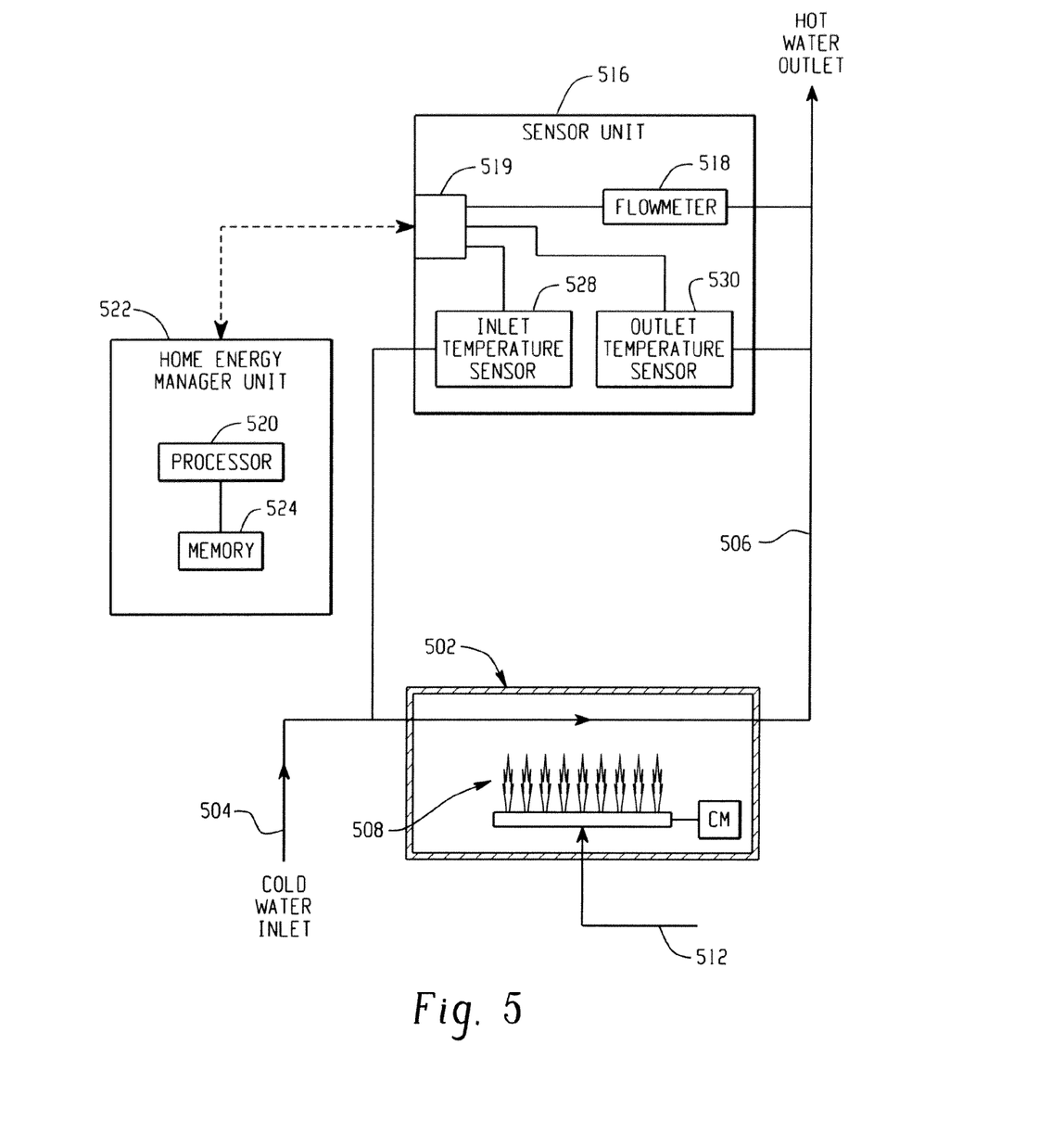
FIG. 5 is a schematic diagram of still another exemplary hydrocarbon-fueled hot water heater in accordance with the present disclosure.

Turning to FIG. 5, a tankless water heater 502 is illustrated including a cold water inlet 504, a hot water outlet 506, and a heat source 508. Typically, the heat source of a tankless water heater will be a gas burner. Fuel is supplied to the gas burner via the fuel supply 512. When a consumer needs hot water, the burner is ignited and applies heat to a volume of water between the inlet 504 and the outlet 506. As is well known, the burner of a tankless water heater is sized so as to generate enough heat to provide constant supply of hot water to the hot water outlet 506.

In order to carry out the above-described calculations based on water flow, a sensor unit 516 is provided including a flow meter 518 for measuring the flow of hot water exiting the hot water heater 502. As will be understood, the schematic diagram shows the sensor unit 516 separate from the water heater 502 but it could also be integrated into the water heater 502 as desired. The flow meter 518 is configured to measure the flow of hot water discharged and communicate such data via a communication interface 519 to a processor, such as the processor 520 associated with a HEM 522, for performing the necessary calculations as set forth above. Of course, flow data can be stored in a memory 524 during operation of the system.

The sensor unit 516 can optionally include an inlet temperature sensor 528 and an outlet temperature 530 sensor for sensing the respective temperatures at the inlet 504 and the outlet 506. These sensors 528 and 530 can increase the accuracy of the energy usage calculations by providing realtime data corresponding to the change in water temperature between the inlet 504 and the outlet 506. As will be appreciated, the inlet temperature can fluctuate based on the season (or other factors), with lower inlet temperatures being more common during colder months of the year. In some cases, the outlet temperature can fluctuate as well. By measuring each of these quantities, more accurate calculations can be performed.

It will be appreciated, however, that various estimated values can be used or set by a user instead of using the temperature sensors to measure water temperature at the inlet and outlet. For example, inlet water temperature could be assumed to be 55 degrees F. while the outlet temperature can be assumed to correspond to the setpoint of the water heater, for example 140 degrees F.

Figure 6:
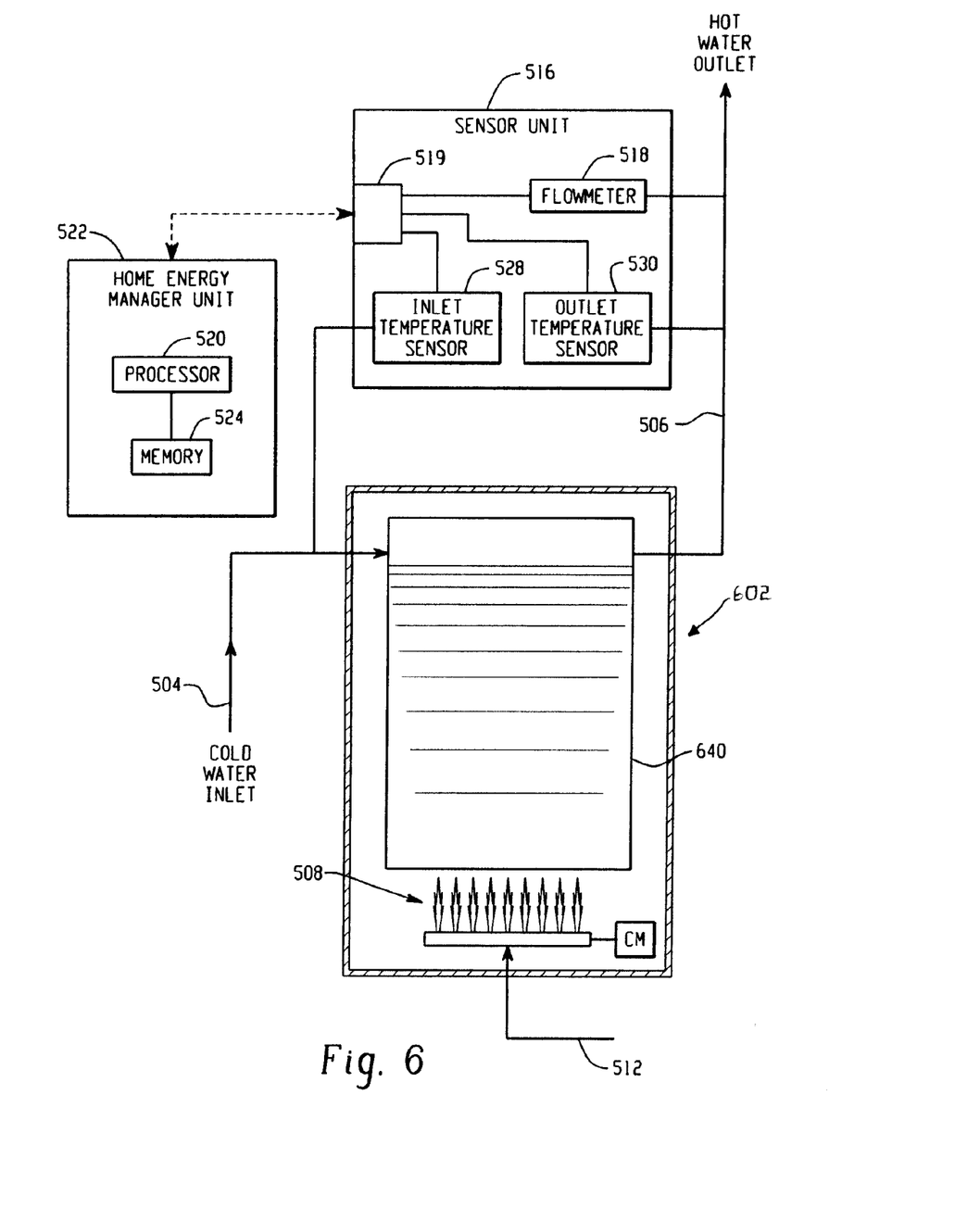
FIG. 6 is a schematic diagram of still yet another exemplary hydrocarbon-fueled hot water heater in accordance with the present disclosure.

With reference to FIG. 6, a similar arrangement can be applied to a water heater having a tank. In this embodiment, the system is identical to the system shown in FIG. 5 except that the water heater 602 includes a reservoir 640. As will be understood by those skilled in the art, the water within the tank tends to stratify with higher temperature water occupying the upper portion of the tank and lower temperature water occupying the lower portion of the tank. As such, as hot water is dispensed from the outlet 106, the temperature of such water will tend to decrease over time. Using the temperature sensors, however, this decrease can be accounted for in the calculations of energy consumption.

For example, energy consumption can be calculated based on water flow and the temperature of the water at the inlet and outlet using the following process and assumptions:

Qin=Qout

Qin=input water volume (gpm) @ 55-75 F (one could assume inlet temp or measure using temperature sensor as shown)

Qout=output water volume (gpm) @ 140 F initially for a 140 F setpoint. Note that water temperature will drop as additional water is dispensed.

To calculate the gas consumed for a given water dispense, one must first calculate the heat required to heat that volume of water from the inlet temperature to the outlet temperature.

Calculate Heat required to heat 20 gallons of water assume 55 F inlet and 140 F outlet)

$q = m \times Cp \times \text{Delta } T$ $q = 20 \text{ gal} \times 1 \text{ ft}^3/7.48 \text{ gal} \times 62.4 \text{ lbm/ft}^3 \times 1.0 \text{ Btu/lbm-}F \times (140-55) = 14181.8 \text{ BTU}$ Assume that the gas burner is 55,000 BTU/hr input with an efficiency of 65% (the homeowner could input the efficiency of their water heater as a querry from the HEG)

Calculate the time the burner must be on to generate 14181.8 BTU with an efficiency of 65%

Time=heat required/(burner rating×burner efficiency)

Time=14181/(55000*0.65)=0.396671329 hours=23.8 minutes

Calculate the gas required to deliver 55000 Btu/hr input energy heat of combustion for natural gas is about 1040 Btu/ft^3

Mass of gas=heat delivered/heat of combustion=55000 Btu/hr/1040 Btu/ft^3=52.9 ft^3/hr 0.88 cfm Gas to heat 20 gal=gas flow×gas burner on time=0.88 cfm×23.8 minutes=20.9 cubic feet of gas If one assumes that gas costs $7.46 per 1000 ft^3, then it cost how much to heat the 20 gallons (the homeowner could input the cost for gas or the meter could send this info to the HEG)

Cost=20.9/1000*7.46=$0.16

Just as one can calculate the amount of gas required to dispense 20 gallons of water at 140 F, one can readily see that the amount of gas would lessen as the water temperature of the discharge water is reduced. This would occur since the water was not resident in the heater long enough to have imparted full heating from 55° F. to 140° F. Also, it will be evident that one can assume the inlet and outlet temperatures or they can be actually measured using transducers on the entry and discharge piping. This could be an issue in cases of PVC piping, however, in such cases copper could still be used for a short distance and then transition to PVC or other temperature sensing arrangement could be employed. The flowmeter would provide the volume of water flow.

Once the HEM has the information regarding the cost of heating (water or a space using a furnace) using the system from the method described above, it could then make a decision to heat with gas or electricity (in cases where dual fuel systems are employed), choosing whichever was the most cost effective since the HEM would know the real time pricing of both energy sources. This would however, require some means of disabling the gas device and activating the electric device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A hydrocarbon-fueled hot water heater for supplying hot water comprising:
 a cold water inlet;
 a hot water outlet;
 a burner configured to burn a hydrocarbon fuel to apply heat to a volume of water between the inlet and the outlet;
 a sensor for monitoring a temperature during a time period to create a temperature profile, the temperature profile comprising a slope that tracks activation and deactivation of the burner;
 a processor coupled to a memory and in communication with the sensor, the processor configured to determine an amount of time the burner is activated based on the slope of the temperature profile and to estimate an amount of fuel consumed by the hydrocarbon-fueled hot water heater.

2. A hydrocarbon-fueled hot water heater as set forth in claim 1, wherein the processor is remote from the hot water heater.

3. A hydrocarbon fueled hot water heater as set forth in claim 1, wherein the sensor includes at least one of a thermocouple, a thermistor or an infrared sensor to sense activation of the burner by sensing a change in temperature due to burning of a hydrocarbon fuel.

4. A hydrocarbon-fueled hot water heater as set forth in claim 1, farther comprising a display for displaying an indicator corresponding to the fuel consumed by the hot water heater.

5. A hydrocarbon-fueled hot water heater as set forth in claim 4, wherein at least one of total energy consumption or cost, annual energy consumption or cost, monthly energy consumption or cost, weekly energy consumption or cost, daily energy consumption or cost, hourly energy consumption cost, and instantaneous energy consumption or cost is displayed on the display.

6. A hydrocarbon-fueled hot water heater as set forth in claim 4, wherein the display is remote from the water heater.

7. A hydrocarbon-fueled hot water heater as set forth in claim 4, wherein at least one of a numerical value, graphical representation, color, or shape corresponding to fuel consumed is displayed on the display.

8. A home energy management system including a home energy manager and a hot water heater as set forth in claim 1, wherein the home energy manager includes the processor.

9. A hydrocarbon-fueled hot water heater as set forth in claim 1, wherein the processor is configured to:
 convert the sensed volume of water to a weight;
 multiply the weight by a factor corresponding to an amount of energy required to heat a unit weight of the water by 1 degree;
 multiply the value obtained in the preceding step by the change in water temperature between the inlet and the outlet to determine energy required to heat the sensed volume of water;
 divide the energy required to heat the sensed volume of water by a gross heat of combustion value for the fuel used by the water heater to determine the amount of fuel used by the water heater over a given period of time based on the volume of water flowing through the hot water heater.

10. A hydrocarbon-fueled hot water heater as set forth in claim 9, wherein the hot water heater is of a tankless design.

11. A hydrocarbon-fueled hot water heater as set forth in claim 9, further comprising a communication interface for communicating fuel usage data to a home energy manager.

12. A hydrocarbon-fueled hot water heater as set forth in claim 1, wherein the sensor is positioned adjacent to the burner.

13. A hydrocarbon-fueled hot water heater as set forth in claim 1, wherein the sensor is positioned in a vent pipe.

* * * * *